Figure 1:
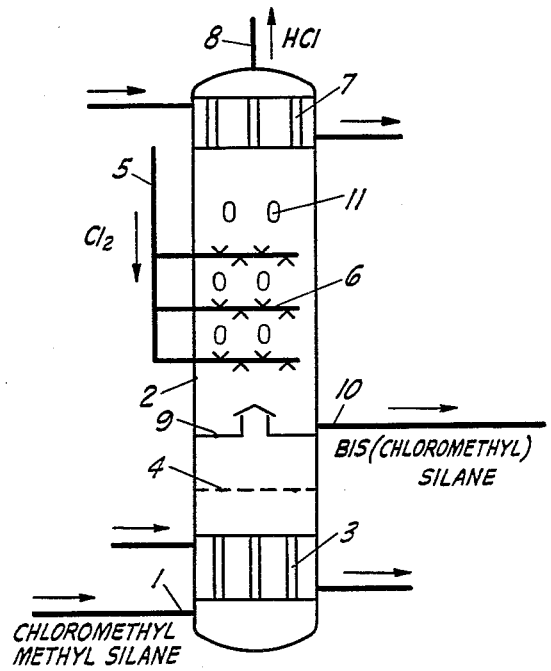
Figure 2:
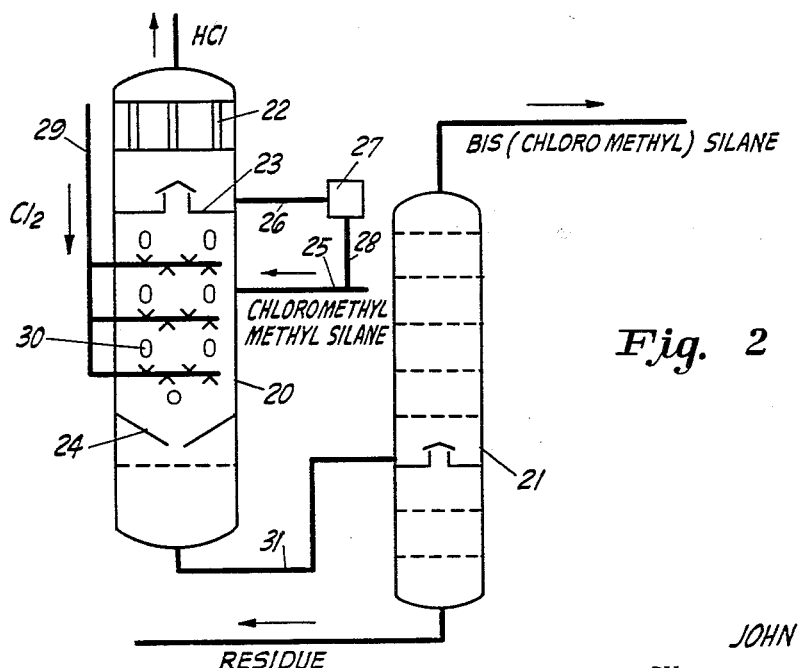

Aug. 9, 1955

J. L. SPEIER, JR 2,715,134

CHLORINATION OF CHLOROMETHYLMETHYLSILANES

Filed June 13, 1951

INVENTOR.
JOHN L. SPEIER, JR.

BY

ATTORNEY

United States Patent Office 2,715,134
Patented Aug. 9, 1955

2,715,134

CHLORINATION OF CHLOROMETHYLMETHYL-SILANES

John L. Speier, Jr., Pittsburgh, Pa., assignor to Dow Corning Corporation, Midland, Mich., a corporation of Michigan Application June 13, 1951, Serial No. 231,377

4 Claims. (Cl. 260—448.2)

The present invention relates to the chlorination of organosilicon compositions and in particular relates to the chlorination of chloromethyl methyl silanes to produce bis(chloromethyl)silanes.

Krieble and Elliott, 67 J. A. C. S. (1945), pages 1810–1812, shows the chlorination of trimethylchlorosilane and dimethyldichlorosilane in liquid phase. They showed that a chloromethyl group was chlorinated in preference to a methyl group. Thus, they obtained $(CH_3)_2SiCl(CH_2Cl)$, $(CH_3)_2SiCl(CHCl_2)$ and trichloromethyl derivatives. They obtained only a very small yield of bis(chloromethyl)-methylchlorosilane. The polychlorinated products obtained were predominantly of the type having a plurality of chlorines on a single carbon atom.

It is desirable to avoid such polychlorination of the same carbon atom, since this type of polychlorination weakens the C—Si bond.

It is an object of the present invention to provide an improved method for the production of bis(chloromethyl)silanes.

In accordance with the present invention an organosilicon composition of the general formula,

$$(CH_3)_a(CH_2Cl)_bSiCl_{4-a-b}$$

is chlorinated in vapor phase. In the above formula $a$ has a value of from 1 to 3 inclusive, $b$ has a value of from 1 to 2 inclusive, and $a+b$ has a value of from 2 to 4 inclusive. The organosilanes which are chlorinated include

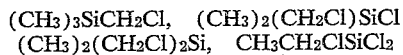

$(CH_3)_3SiCH_2Cl$, $(CH_3)_2(CH_2Cl)SiCl$
$(CH_3)_2(CH_2Cl)_2Si$, $CH_3CH_2ClSiCl_2$
and $CH_3(CH_2Cl)_2SiCl$.

In the method hereof, the temperature of the reaction chamber is maintained between the boiling point at the pressure employed of the organosilane being chlorinated and that of the chlorinated product which contains one more chlorine than the reactant. Accordingly, the reactants are in vapor phase whereas the chlorinated product is condensed as formed, whereby the product automatically is removed from the reaction zone. This avoids further chlorination of the product after formation.

The rate of the chlorination reaction may be accelerated by exposure of the reaction zone to light, preferably sunlight or any other source of high intensity light.

The accompanying drawing containing Figs. I and II are flow-sheets which illustrate specific modes of operation of the process hereof.

In the system as disclosed in Figure I, the reactant, a liquid chloromethylmethylsilane is admitted by line 1 into the bottom of the chlorinator 2. The bottom of the chlorinator is provided with a steam heated heat exchanger 3 which causes vaporization of the reactant. The vapors rise from the liquid level 4 through trap-out plate 9 into the chlorinating section. Chlorine is introduced by line 5 through chlorine diffuser 6. The silane vapor and the chlorine mix in the chlorinator. The top zone of the chlorinator is provided with heat exchanger 7 to condense silane vapor from effluent hydrogen chloride which is removed by line 8. Chlorinated product which is formed boils at a temperature above the temperature of the chlorinator. It therefore condenses and drops to trap-out plate 9 where it collects. The product is withdrawn by line 10. Suitable lights 11 are provided in the wall of the chlorinator to accelerate the reaction.

In the system as disclosed in Fig. II, the reactants are maintained in vapor phase in the chlorinator 20. The chlorinator communicates with a distillation column 21, which serves to separate the bis(chloromethyl)silane from the small amount of residue which is obtained. The chlorinator 20 is provided with three zones. The top zone of the chlorinator is provided with a heat exchanger 22 to condense chloromethylmethylsilane vapors rising in the chlorinator in mixture with hydrogen chloride. This top zone is separated from the reaction zone therebelow by a trap-out plate 23 for removing liquid phase chloromethylmethylsilane from the chlorinator. Spaced from the bottom of the chlorinator 20 there is positioned a plate 24, sloped to drain liquid from the reaction zone into the collector section of the chlorinator therebelow. An inlet 25 for the chloromethylmethylsilane communicates with the reaction zone of the chlorinator 20 between plates 23 and 24. The exact position of the inlet 25 is unimportant. A drain 26 from trap-out plate 23 is provided to remove liquid phase chloromethylmethylsilane. If desired this liquid phase chloromethylmethylsilane may be recycled through vaporizer 27 and line 28 to the inlet line 25. Chlorine may be introduced by diffuser 29 into the reaction zone. Preferably the diffuser 29 is arranged to introduced the chlorine at a multitude of points dispersed throughout the reaction zone in order to prevent high local concentrations of chlorine. Suitable lights 30 are provided in the wall of the reaction zone of the chlorinator 20.

Fractionator 21 is of conventional construction. Line 31 communicates from the lower end of the chlorinator to a mid-point in the fractionator. The level of the inlet into the fractionator is arranged to provide a body of fluid in the base of the chlorinator in order to prevent vapor phase communication of the chlorinator and the fractionating column.

In operation, the feed of the chloromethylmethylsilane is sufficient to maintain an atmosphere of the silane in the reaction zone. The chlorine which is introduced thereinto reacts rapidly therewith. While it would be possible to balance the operation and maintain the feed of the chloromethylmethylsilane just sufficient that no more is introduced than is adequate to provide a continuous atmosphere thereof, in the reaction zone, the most efficacious manner of commercial operation involves feeding an excess thereof to the chlorinator 20, whereby a portion of the chloromethylmethylsilane is condensed in a heat exchanger 22 and recycled through lines 26, 28 and 25.

The reaction zone is maintained at a temperature between the boiling point of the chloromethylmethylsilane and of the bis(chloromethyl)silane. Accordingly, upon the chlorination of any portion of the chloromethylmethylsilane, the chlorinated derivative will immediately condense and drop to plate 24 at the lower end of the chlorination zone and then drain into the body of liquid in the lower end of the chlorinator 20. The chlorinated product then flows from the body of liquid into the fractionator in which the bis(chloromethyl)silane is separated from the residue.

The compositions produced by the method of the present invention have special utility as intermediates in the production of other organosilicon materials. Thus, the bis(chloromethyl)silanes of the present invention may be converted to alcohols by reaction with potassium acetate and by hydrolysis of the bis-acetoxymethylsilane produced. The polyhydric alcohols so produced may be converted to resins by reaction with phthalic anhydride and a small amount of glycerine. Such resins are of utility as paint and varnish vehicles.

The following examples illustrate the method of the present invention.

Example 1

302 parts by weight of chloromethyldimethylchlorosilane was fed into the bottom of a reaction zone. This silane vaporized, coming in contact with 71 parts of chlorine at a temperature of 114 to 134° C. and in the presence of strong light. HCl was continually removed from the top of the reaction zone. The product was also continually removed from the zone. Distillation of the crude product gave the following:

| Compound | Parts by Weight | Mole, Percent |
|---|---|---|
| (1) $(CH_3)_2SiCl(CH_2Cl)$ | 54 | 18.0 |
| (2) $(CH_3)_2SiCl(CHCl_2)$ | 164 | 43.8 |
| (3) $(CH_3)_2SiCl(CCl_3)$ | 26 | 5.9 |
| (4) $CH_3SiCl(CH_2Cl)_2$ | 75 | 20.0 |
| (5) $CH_3SiCl(CH_2Cl)(CHCl_2)$ | 21.8 | 10.3 |
| Residue | 4.9 | 2.0 |

In this method the ratio of the mole percent of compound (2) to compound (4) is 2.19. When liquid phase chlorination is employed a mole ratio of 4.9 is obtained.

Example 2

Trimethylchloromethylsilane was chlorinated in the system shown in Fig. 1 at a temperature just above the boiling point thereof. The crude product obtained was distilled and the following yields were obtained:

| Compound | Parts by Weight | Mole, Percent |
|---|---|---|
| $(CH_3)_3SiCH_2Cl$ | 186 | 28.5 |
| $(CH_3)_3SiCHCl_2$ | 226 | 27.2 |
| $(CH_3)_2Si(CH_2Cl)_2$ | 340 | 40.9 |
| Residue | 35 | 3.4 |

That which is claimed is:

1. The method of preparing poly(monochloromethyl)-silanes which comprises continually charging into a reaction zone chlorine and a chloromethylmethylsilane of the general formula $(CH_3)_a(CH_2Cl)_bSiCl_{4-a-b}$ where $a$ has a value of from 1 to 3, $b$ has a value of from 1 to 2, and $a+b$ has a value of from 2 to 4, each inclusive, maintaining the temperature of the reaction zone at between the boiling points of the chloromethylmethylsilane charged and of the chlorinated product containing one more chlorine atom per silicon than the chloromethylmethylsilane charged, whereby poly(monochloromethyl)silanes having a higher degree of substitution of monochloromethyl groups per silicon atom than the chloromethylmethylsilane charged are produced and condensed upon formation, and are continually removed from the reaction zone.

2. The method in accordance with claim 1 in which the chloromethylmethylsilane charged is chloromethyldimethylchlorosilane and in which the poly(monochloromethyl)silane produced is methylbis(chloromethyl)-chlorosilane.

3. The method in accordance with claim 1 in which the chloromethylmethylsilane is trimethylchloromethylsilane and in which the poly(monochloromethyl)silane produced is dimethylbis(chloromethyl)silane.

4. In the preparation of poly(monochloromethyl) silanes by the chlorination of a methyl silane, the improvement which comprises continually charging into a reaction zone chlorine and a chloromethylmethylsilane of the general formula $(CH_3)_a(CH_2Cl)_bSiCl_{4-a-b}$ where $a$ has a value of from 1 to 3, $b$ has a value of from 1 to 2, and $a+b$ has a value of from 2 to 4, each inclusive, maintaining the temperature of the reaction zone at between the boiling points of the chloromethylmethylsilane charged and of the chlorinated product containing one more chlorine atom per silicon than the chloromethylmethylsilane charged, whereby poly(monochloromethyl)silanes having a higher degree of substitution of monochloromethyl groups per silicon atom than the chloromethylmethylsilane charged are produced and condensed upon formation, and are continually removed from the reaction zone.

References Cited in the file of this patent

UNITED STATES PATENTS

| | | |
|---|---|---|
| 2,474,578 | Gilliam | June 29, 1949 |
| 2,510,149 | Spier | June 6, 1950 |
| 2,513,924 | Elliott et al. | July 4, 1950 |

OTHER REFERENCES

Kreible et al., "Jour. Am. Chem. Soc.," vol. 67 (1945), pp. 1810–1812.

Speier et al., "Jour. Amer. Chem. Soc.," vol. 70, page 1400 (1948).